(12) United States Patent
Kredi et al.

(10) Patent No.: US 10,726,608 B2
(45) Date of Patent: Jul. 28, 2020

(54) SYSTEM AND METHOD FOR REAL-TIME RENDERING OF COMPLEX DATA

(71) Applicant: 3D Systems, Inc., Rock Hill, SC (US)

(72) Inventors: Oren Kredi, Jerusalem (IL); Yaron Vaxman, Petach Tikva (IL); Roy Porat, Tel Aviv (IL)

(73) Assignee: 3D Systems, Inc., Rock Hill, SC (US)

( * ) Notice: Subject to any disclaimer, the term of this patent is extended or adjusted under 35 U.S.C. 154(b) by 51 days.

(21) Appl. No.: 15/360,326

(22) Filed: Nov. 23, 2016

(65) Prior Publication Data

US 2018/0144539 A1   May 24, 2018

(51) Int. Cl.
*G06T 15/08* (2011.01)
(52) U.S. Cl.
CPC .......... *G06T 15/08* (2013.01); *G06T 2210/41* (2013.01)
(58) Field of Classification Search
None
See application file for complete search history.

(56) References Cited

U.S. PATENT DOCUMENTS

| | | | | |
|---|---|---|---|---|
| 2003/0214502 A1* | 11/2003 | Park | ...................... | G06T 15/205 345/420 |
| 2003/0223627 A1* | 12/2003 | Yoshida | ................ | G06T 7/0012 382/128 |
| 2005/0043835 A1 | 2/2005 | Christensen | | |
| 2007/0008317 A1* | 1/2007 | Lundstrom | ............. | G06T 15/08 345/424 |
| 2007/0165917 A1* | 7/2007 | Cao | ...................... | G06K 9/4638 382/128 |
| 2007/0248265 A1 | 10/2007 | Lundstrom et al. | | |
| 2007/0297560 A1* | 12/2007 | Song | ................... | G01V 5/0083 378/4 |
| 2011/0227934 A1* | 9/2011 | Sharp | ................... | G06F 9/5044 345/502 |
| 2011/0255763 A1* | 10/2011 | Bogoni | .................. | G06T 19/00 382/131 |
| 2012/0133656 A1* | 5/2012 | McKenzie | ............. | G06T 15/06 345/424 |
| 2012/0293514 A1 | 11/2012 | Virtue et al. | | |
| 2013/0034282 A1* | 2/2013 | Kaufman | ............. | G06T 7/0014 382/128 |

(Continued)

FOREIGN PATENT DOCUMENTS

WO   WO 2007/061931 A2   5/2007
WO   WO 2016/033405 A1   3/2016

OTHER PUBLICATIONS

Ahmed et al. A Modified Fuzzy C-Means Algorithm for Bias Field Estimation and Segmentation of MRI Data, IEEE Transactions on Medical Imaging, vol. 21, No. 3, Mar. 2002, 193-199.

(Continued)

*Primary Examiner* — Andrew G Yang
(74) *Attorney, Agent, or Firm* — Pearl Cohen Zedek Latzer Baratz LLP (57) ABSTRACT

Methods for volume rendering of 3D object data are provided. The methods can include classifying 3D object data and determining a transfer function to use to render the 3D object data based on the classification; incrementally determining voxels to render from the 3D object data; and/or determining a grid that represents the voxels and rendering based on the voxel grid.

11 Claims, 6 Drawing Sheets

(56) References Cited

U.S. PATENT DOCUMENTS

| | | | |
|---|---|---|---|
| 2013/0039558 A1* | 2/2013 | Balter | G06K 9/6289 |
| | | | 382/131 |
| 2014/0161334 A1 | 6/2014 | Wang et al. | |
| 2015/0024337 A1* | 1/2015 | Blassnig | G06T 15/06 |
| | | | 433/29 |
| 2015/0125056 A1 | 5/2015 | Dahlqvist Leinhard et al. | |
| 2015/0138201 A1 | 5/2015 | Brown | |
| 2015/0178908 A1* | 6/2015 | Jesenko | G06T 19/20 |
| | | | 433/29 |
| 2015/0320507 A1* | 11/2015 | Qiu | A61B 34/10 |
| | | | 345/419 |
| 2016/0012647 A1* | 1/2016 | Chen | G01V 5/0008 |
| | | | 382/203 |
| 2016/0058288 A1* | 3/2016 | DeBernardis | A61B 5/0077 |
| | | | 600/477 |
| 2016/0093112 A1* | 3/2016 | Haw | G06T 11/60 |
| | | | 345/419 |
| 2016/0123904 A1 | 5/2016 | Masood et al. | |
| 2016/0140770 A1 | 5/2016 | Jonsson et al. | |
| 2016/0180576 A1 | 6/2016 | Schneider | |
| 2016/0361043 A1* | 12/2016 | Kim | A61B 8/463 |
| 2017/0061672 A1* | 3/2017 | Zhou | G06T 15/08 |
| 2017/0221254 A1* | 8/2017 | Zar | G06T 17/00 |
| 2017/0352134 A1* | 12/2017 | Kobayashi | A61B 8/14 |
| 2017/0365087 A1* | 12/2017 | Wald | G06T 15/08 |

OTHER PUBLICATIONS

Kindlmann, Gordon Lothar, Semi-Automatic Generation of Transfer Functions for Direct Volume Rendering, A Thesis Presented to the Faculty of the Graduate School of Cornell University in Partial Fulfillment of the Requirements for the Degree of Master of Science, Jan. 1999, 1-155.

* cited by examiner

| Material | Minimal HU | Maximal HU |
|---|---|---|
| Air | -2048 | -600 |
| Skin | -599 | -150 |
| Fat | -148 | -40 |
| Muscle | -41 | 80 |
| Muscle/Vessel | 81 | 109 |
| Vasculature | 110 | 199 |
| Bone/Vasculature | 200 | 450 |
| Bone | 451 | 700 |
| Dense Bone | 701 | 1300 |
| Teeth | 1301 | 3071 |
| Noise | - | - |
| Bed | - | - |

SYSTEM AND METHOD FOR REAL-TIME RENDERING OF COMPLEX DATA

FIELD OF THE INVENTION

The invention relates generally to rendering data on a computer. More specifically, the invention relates to rendering three-dimensional (3D) objects on a two-dimensional (2D) display, virtual reality and/or augmented reality.

BACKGROUND OF THE INVENTION

Currently, three-dimensional ("3D") objects can be rendered. Current systems can allow for visualizing 3D objects obtained with, for example, imaging devices, other systems and/or inputs. Currently, 3D objects can be processed for 3D printing, visualized on a two-dimensional ("2D") screen, and/or visualized in augmented and/or virtual reality.

Current 3D objects can provide vital information for medical professionals. For example, for a doctor performing heart surgery on a neonate, visualizing the heart of the neonate, rather than a generic neonate heart model, can be the difference between a successful and unsuccessful surgery. It can be desirable to visualize via a computer screen (e.g., two-dimensional ("2D") screen), via virtual reality, via augmented reality and/or by 3D printing a model of the neonate.

Current systems for visualizing 3D objects can be limited. For example, although 3D objects can be presented to a user (e.g., doctor), it can be a presentation that typically does render the 3D object with sufficient speed to avoid delay when zooming or rotating the object. The delay can be so long that it can make usage of these current systems unrealizable. For example, a doctor may want to visualize the 3D object with the patient looking on. In another example, a doctor may want to review the 3D object with another doctor. In these scenarios, the duration it takes current systems to render volumes may prevent the doctor from utilizing these current system in scenarios where real-time processing can be more important. For example, current methods for rendering a CT image with 100 slices can have a rendering rate of 2 frames/second. Virtual reality can require rendering at 90 frames/second.

Separately, current systems can suffer from an inability to render the 3D object with a high level of resolution such that small details (e.g., blood vessels of a heart) of an object can be understood when viewed. One difficulty with accuracy can include differentiating between different parts of a 3D object. For example, when rendering a 3D object that includes tissue, current rendering techniques typically cannot distinguish between soft tissue and blood vessels. Thus, both parts are typically rendered having the same color. Therefore, it can be desirable to volume render 3D objects with sufficient speed and/or accuracy such that the rendering is usable.

SUMMARY OF THE INVENTION

One advantage of the invention is that it can provide an increased rendering speed and/or a reduction in an amount of data during visualization and/or 3D printing, by for example, providing methods that can be faster and/or can require less computations then known methods.

Another advantage of the invention is that it can provide a more accurate representation of 3D objects, showing for example, small details of an object with a high level of fidelity. Another advantage of the invention is that it can provide faster zooming, rotating, mesh creation, mask creation, data modification, and addition and/or removal of segments of the 3D object when visualized. Another advantage of the invention is that it can allow for improved distinguishing between parts of an object.

According to embodiments of the present invention, there is provided methods for volume rendering three-dimensional (3D) image data, and non-transient computer readable mediums containing program instructions for causing the methods.

According to embodiments of the present invention, one method can include determining a material classification for each voxel in the 3D imaging data; determining a corresponding transfer function for each material classification; and rendering each voxel in the 3D imaging data based on a transfer function that corresponds to the material classification corresponding to the voxel. Determining the corresponding transfer function may be further based on a HU value.

In some embodiments of the present invention, the determination of the material classification can further include: determining an initial material classification; segmenting the 3D imaging data; and determining the material classification based on the initial material classification and the segmented 3D imaging data. Determining an initial material classification value may be based on a HU value of the respective voxel, a probability map, or any combination thereof.

In some embodiments of the invention, the segmenting is based on a magnitude of a gradient of each voxel. Segmenting the 3D imaging data may further include determining an intersection between the segmented 3D imaging data.

According to embodiments of the present invention, another method could include: performing a first raycasting on a 3D object to produce a first intermediary frame, performing a second raycasting on the 3D object to produce a second intermediary frame, and mixing the first intermediary frame and the second intermediary frame to render the 3D object.

The first raycasting can have a first position and a first step size, and the second raycasting can have a second start position and a second step size. The first start position and the second position can be different, and the first step size and the second step size can be different. The first step size can be based on the sampling rate of the recasting. The second step size can be based on the first step size and an offset.

In some embodiments of the invention, the second start position can be the first start position with an offset value. The offset value can be randomly generated, input by a user, or any combination thereof.

In some embodiments of the invention, mixing the first intermediary frame values and the second intermediary frame values can further include, for each pixel that is in the same pixel location in the first intermediary frame and the second intermediary frame, mixing the first intermediary frame values and the second intermediary frame values at the pixel location to determine final pixel values at the pixel location.

In some embodiments of the invention, mixing the first intermediary frame values and the second intermediary frame values can further include averaging the first intermediary frame values and the second intermediary frame value, performing a weighted averaging of the first intermediary frame values and the second intermediary frame values, accumulated averaging, or any combination thereof.

According to embodiments of the present invention, another method could include generating a voxel grid based on the 3D object. Each voxel in the voxel grid can have a three dimensional location, a size specification, and voxel values. Each voxel in the voxel grid can represent a center point of a 3D cube volume having the respective size specification. The size specification can be input by a user, based on a type of the 3D object, size of the 3D object of any combination thereof.

For each voxel in the voxel grid, whether the 3D cube volume is empty can be determined. If the 3D cube volume is empty, an empty value can be assigned to the current voxel in the voxel grid. If the 3D cube volume is not empty, a present value can be assigned to the current voxel in the voxel grid. For each voxel in the voxel grid having a present value, the corresponding 3D cube volume based on the corresponding 3D object can be rendered to a frame for display on the 3D screen.

In some embodiments, the method involves rendering the voxel grid based on the present and empty values to a frame for display on the 3D screen. The rendering can be performed on a graphical processing unit.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure can be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to the organization and the method of operation, together with objects, features and advantages thereof, can best be understood by reference to the following detailed description when read with the accompanied drawings. Embodiments of the invention are illustrated by way of example and are not limited to the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element. Further, where considered appropriate, reference numerals can be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments. For the sake of clarity, discussion of same or similar features or elements cannot be repeated.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes. Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
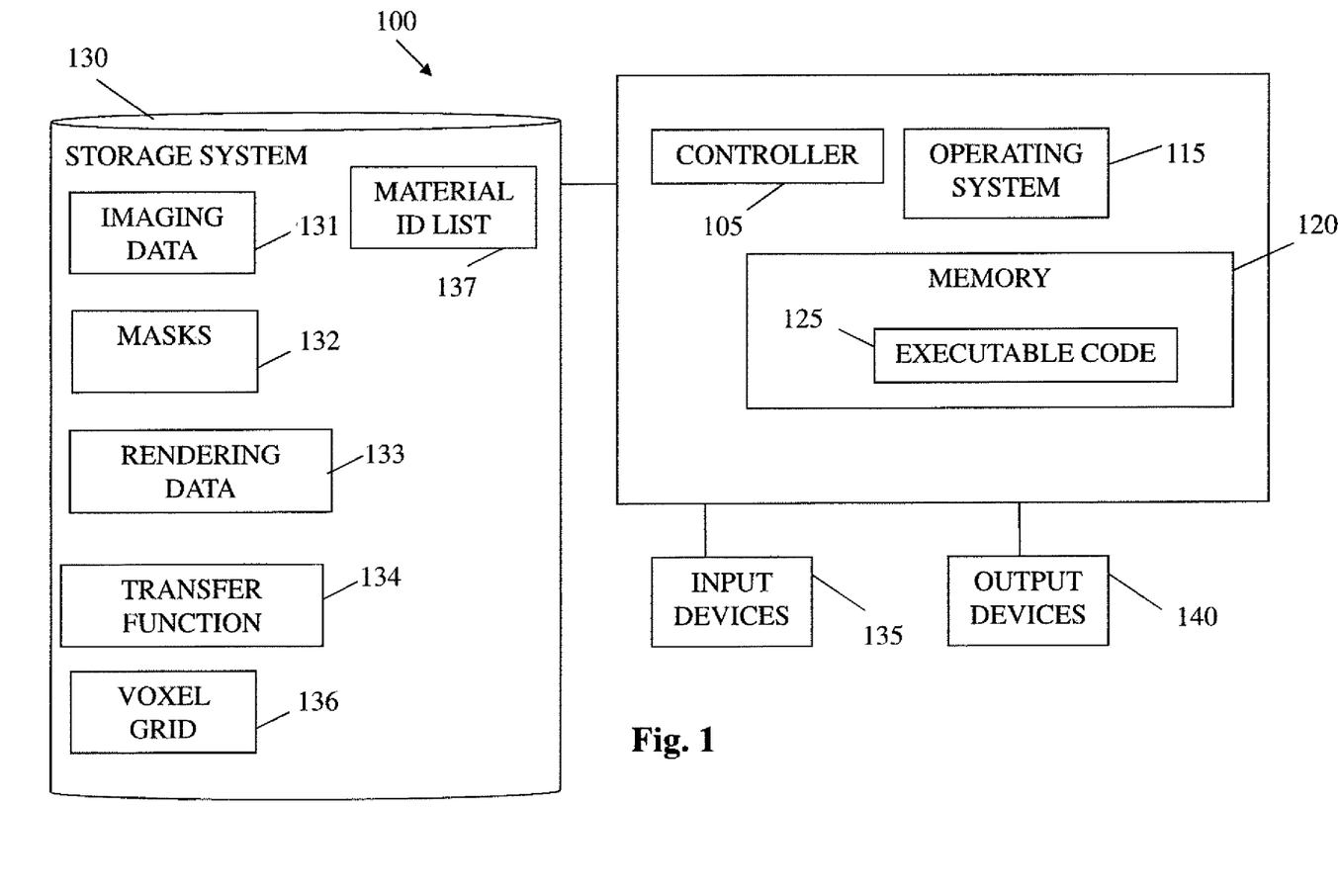
FIG. 1 shows a block diagram of a computing system for volume rendering, according to an illustrative embodiment of the invention.

FIG. 1 shows a block diagram of a computing system for volume rendering, according to an illustrative embodiment of the invention. Computing system 100 can include a controller 105 that can be, for example, a graphical processing unit (GPU) and/or a central processing unit processor (CPU), a chip or any suitable computing or computational device, an operating system 115, a memory 120, executable code 125, a storage system 130, input devices 135 and output devices 140.

Controller 105 (or one or more controllers or processors, possibly across multiple units or devices) can carry out methods described herein, and/or execute the various modules, units.

Operating system 115 can include any code segment (e.g., one similar to executable code 125 described herein) that can perform tasks involving coordination, scheduling, arbitration, supervising, controlling or other managing operation of computing system 100, for example, scheduling execution of software programs or executable code segments, or enabling software programs or other modules or units to communicate. Operating system 115 can be a commercial operating system.

Memory 120 can be a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units, or any combination thereof. Memory 120 can be or can include a plurality of memory units. Memory 120 can be a computer or processor non-transitory readable medium, or a computer non-transitory storage medium, e.g., a RAM.

Executable code 125 can be any executable code, e.g., an application, a program, a process, task or script. Executable code 125 can be executed by controller 105 possibly under control of operating system 115. For example, executable code 125 can be an application that renders a 3D objects onto a 2D screen or produces instructions for printing a 3D object by a 3D printer as further described herein. Although, for the sake of clarity, a single item of executable code 125 is shown in FIG. 1, a system according to some embodiments of the invention can include a plurality of executable code segments similar to executable code 125 that can be loaded into memory 120 and cause controller 105 to carry out methods described herein. For example, units or modules described herein can be, or can include, controller 105, memory 120 and executable code 125.

Storage system 130 can be or can include, for example, a hard disk drive, a Compact Disk (CD) drive, a CD-Recordable (CD-R) drive, a Blu-ray disk (BD), a universal serial bus (USB) device or other suitable removable and/or fixed storage unit. Content can be stored in storage system 130 and can be loaded from storage system 130 into memory 120 where it can be processed by controller 105. As shown, storage system 130 can store 3D objects (e.g., imaging data 131), mask data 132, rendering data 133, a transfer function data 134, voxel grid data 136, and/or a material ID list 137. The 3D object can include any data that is representative of a 3D object. The 3D objects can include 3D imaging data, mesh data, volumetric objects, polygon mesh objects, point clouds, functional representations of 3D objects, cad files, 3D pdf files, STL files, and/or any inputs that can represent a 3D object. The 3D imaging data can include medical imaging data, including Computed Tomography ("CT") imaging data, a Cone Beam Computed Tomography ("CBCT") imaging data, a Magnetic Resonance Imaging ("MRI") imaging data and/or MRA imaging data (e.g., MRI with a contrast agent) or ultrasound imaging data. The 3D objects can be of anatomy (e.g., complex anatomy), industrial data, or any 3D object.

Data stored in storage system 130 is further described herein. As is apparent to one of ordinary skill in the art, the storage system 130 and each dataset therein, can all be in one storage system or distributed into multiple storage systems, in various configurations.

In some embodiments, some of the components shown in FIG. 1 can be omitted. For example, memory 120 can be a non-volatile memory having the storage capacity of storage system 130. Accordingly, although shown as a separate component, storage system 130 can be embedded or included in memory 120.

Input devices 135 can be or can include a mouse, a keyboard, a touch screen or pad or any suitable input device. It will be recognized that any suitable number of input devices can be operatively connected to computing system 100 as shown by block 135. Output devices 140 can include one or more screens, displays or monitors, speakers and/or any other suitable output devices. It will be recognized that any suitable number of output devices can be operatively connected to computing system 100 as shown by block 140.

Any applicable input/output (I/O) devices can be connected to computing system 100 as shown by blocks 135 and 140. For example, a wired or wireless network interface card (NIC), a printer, a universal serial bus (USB) device or external hard drive can be included in input devices 135 and/or output devices 140.

A system according to some embodiments of the invention can include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system can additionally include other suitable hardware components and/or software components. In some embodiments, a system can include or can be, for example, a personal computer, a desktop computer, a laptop computer, a workstation, a server computer, a network device, or any other suitable computing device. For example, a system as described herein can include one or more devices such as computing system 100.

Imaging data 131 can be any imaging data as known in the art, e.g., imaging data 131 can be medical data such as produced by a CT system or by an MRI system and/or by a CBCT system.

A mask included in masks 132 can correspond to object types. For example, for an object of a heart, the masks can be the right ventricle, the left ventricle, a right aorta, a left aorta. For a cellphone, the masks can be keys, buttons, wires, computer chips, screens, etc. A mask may be, for example, a data construct including, for example, Boolean (e.g., I/O, yes/no) values for each voxel or data point in a larger data set. A mask may include visual markers (e.g., color and/or patterns) that specify appearance of the voxel. The mask when applied to the larger data set may indicate that a voxel is marked or is not marked.

In some embodiments, input of a 3D object (e.g., an organ such as a head or heart) is received. The system can retrieve from memory a set of masks that correspond to a type of the object. The system can populate each mask in the set of masks with the corresponding 3D object data. For example, an imaging data of a heart, a left chamber mask and a right chamber mask can be retrieved from memory. A portion of the imaging data that corresponds to the right chamber of the heart can be assigned to the right chamber mask and the portion of the imaging data that corresponds to the left chamber mask can be assigned to the left chamber mask.

Operations performed on masks can include operations performed on voxels, e.g., eroding, dilating, expanding or shrinking voxel sizes and so on. It will be understood that masks, meshes and voxels can be, or can be represented or described by, digital objects as known in the art, accordingly, any morphological or logical operations can be performed for or on masks, meshes and voxels and described herein. For example, dilating a voxel can include changing one or more values of the voxel, e.g., size, location and so on.

For example, using morphological or logical operations, a group A of voxels can be dilated with spherical element of radius R (denoted herein as "A⊕R"), a group A of voxels can be eroded with spherical element of radius R (denoted herein as "A⊖R"), a group A of voxels can be opened with spherical element of radius R (denoted herein as "A⊙R") and a group A of voxels can be closed with spherical element of radius R (denoted herein as "A⊙R").

The system can render the set of masks having assigned imaging data into a format that can be displayed on a 2D screen, displayed in virtual reality, displayed in augmented reality and/or 3D printed. For example, based on imaging data received from a CT or an MRI system and based on a set of masks, some embodiments can produce frames for displaying a 3D object on a 2D screen.

Rendering data 133 can be any data usable for rendering an image or for printing a 3D object. For example, rendering data 133 can be a set of pixel values (e.g., RGBA and HU values, hue, intensity and so on) that can be used to render or print an image or object as known in the art and/or rendering data 133 can be a set of instructions that can be used to cause a 3D printer to print an object as known in the art.

Transfer function 134 can be any function or logic. For example, transfer function 134 can be a function or logic that receives a set of input values (e.g., a HU value and a material identification) and produces as output a description of a pixel, e.g., RGBA values, location or offset of the pixel and the like. For example, transfer function 134 can include a set of transformation tables for a respective set of organs, e.g., a first transformation table for a heart, a second transformation table for a bone, and each transformation table can associate HU values with pixel descriptions as described.

Voxel grid 136 can be a set of voxels that represents a space or volume. For example, a voxel grid can be a set of voxels that represents a space containing a 3D organ or system, e.g., voxels in a voxel grid can cover, include, or occupy the space that includes a 3D representation of a blood vessel or system, a head and the like. Any number of voxel grids can be used, for example, a first voxel grid can cover an entire object, organ or space, a second voxel grid can cover or relate to bones, a third voxel grid can describe, include, cover or be otherwise related to blood vessels and so on.

Material identification (ID) list 137 can be any list, table or construct that maps or links a set of values to a respective set of materials. For example, material ID list 137 can map HU values to materials, e.g., as shown by table 310 in FIG. 3.

A mesh (or polygon mesh or triangle mesh as known in the art) can be a set of vertices, edges and faces that define or describe a 3D object. As known in the art, a mesh can be used for conversion into a format for 3D printing.

During volume rendering, it can be desirable to render a volume that distinguishes between parts of a 3D imaging data. For example, distinguishing between bone and a bed a patient lies upon during imaging.

In one aspect, the invention can involve determining a transfer function from a set of transfer functions for each voxel in the 3D imaging data based on a material classification index. Varying the transfer function among voxels within the 3D imaging data can allow for high quality images that have clarity, by for example, selecting a transfer function that corresponds to a particular part of an object being rendered.

Figure 2:
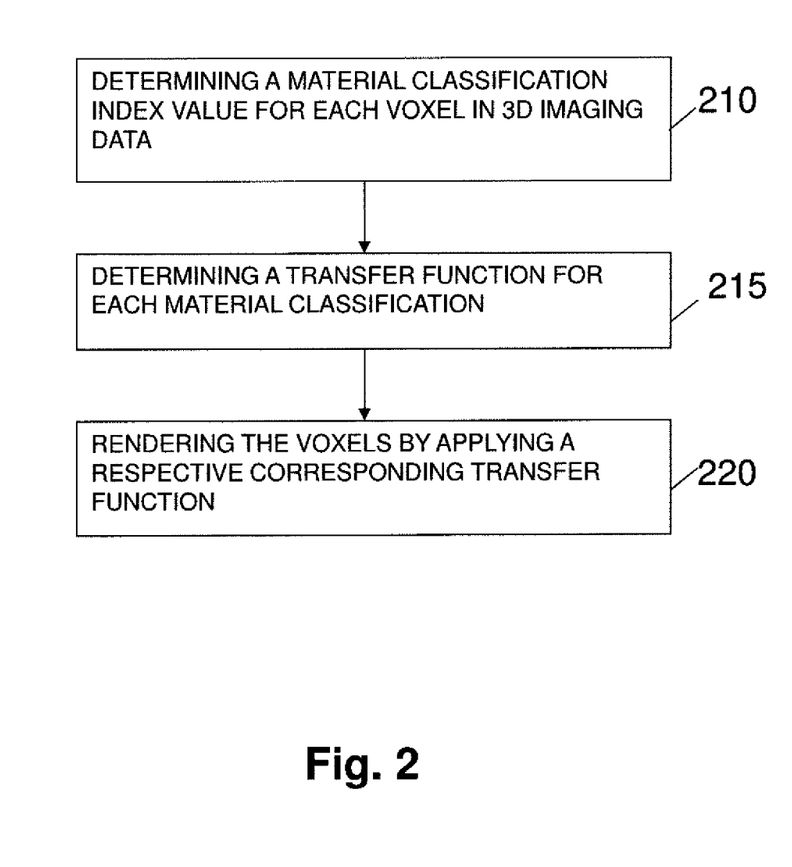
FIG. 2 shows a flowchart of a method for rendering 3D objects, according to an illustrative embodiment of the invention.

FIG. 2 is flowchart of a method for volume rendering, according to an illustrative embodiment of the invention. The method involves determining a material classification for each voxels in a 3D imaging data (Step 210). The material classification can be determined based one or more attribute values of the voxel. For example, the material classification can be determined based on the HU attribute as follows: a voxel with the HU value in the range of −2048 to −600 can be assigned a material classification of air, a voxel with a HU value that is in the range of 200 to 450 can be assigned a material classification of bone.

In some embodiments, the material classification is determined by i) performing an initial material classification of the voxels in the 3D imaging data, ii) segmenting the voxels in the 3D imaging data, and/or iii) performing a final material classification of the segmented voxels in the 3D imaging data.

i. Performing an Initial Material Classification

The initial classification can vary based on the type of 3D imaging data (e.g., CT imaging data, CBCT imaging data, or MRA (MR plus contrast agent) imaging data).

Figure 3:
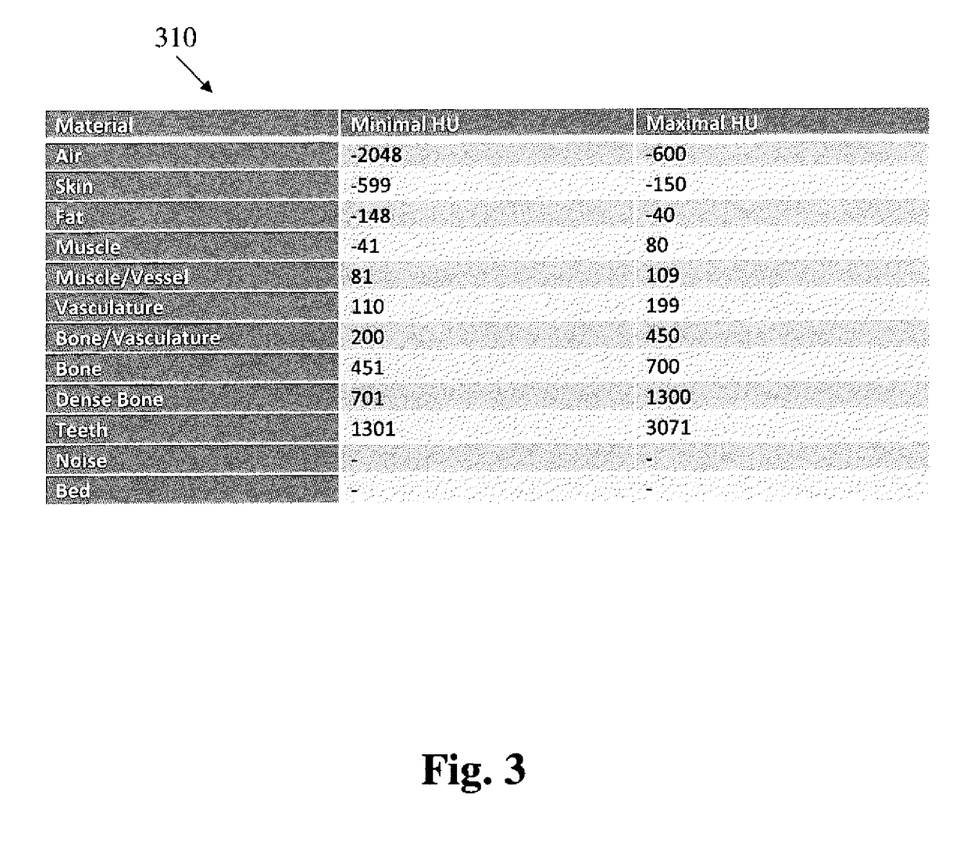
FIG. 3 shows a table that can be used with the method of FIG. 2, according to an illustrative embodiment of the invention.

For CT imaging data, the initial material classification can be based on the HU attribute. For example, FIG. 3 shows an example of table 310 that can be used to determine an initial material classification. As shown by table 310, the HU ranges can correspond to material type. As is apparent to one of ordinary skill in the art, table 310 is an example only, and HU values can be assigned to different material types.

For CBCT imaging data, the initial material classification can be based on results of a bias field estimation. The bias field estimation can be determined as shown in M. N. Ahmed et. al. "A Modified Fuzzy C-Means Algorithm for Bias Field estimation and Segmentation of MRI Data" 2002, IEEE Transactions on medical imaging, incorporated herein by reference in its entirety, with the following as example inputs: expected means, $\sigma=0.5$, $\varepsilon=10^{-5}$, $\alpha=1$, $p=2$. The expected means can be determined by determining a Gaussian Mixture Model of 6 Gaussians with means $U_i$. The expected means of each material can be determined by a maximization upon voxels in the range of [−500, 3000] The expected means can be set to $[U_1, \ldots U_6, -1000]$. An output of the bias field estimation can represent the bias field and a set of probability 3D Volumes $P_i$ for each material. A Best Probability Map (BPM) can be determined based on the index i of the maximal probability for each voxel. The initial material classification can be based on the BPM values. For example, voxels with a BPM value of 7 can be initially classified as "Air"; voxels with BPM values of 1, 2, 3 can be initially classified as "Soft Tissue"; voxels with BPM value of 4, 5, 6 can be initially classified as "Bone."

For MRA imaging data, the initial material classification can be based on the bias field estimation, e.g., as described above with respect to CBCT imaging data, with the following as example inputs: expected means, $\sigma=1$, $\varepsilon=10^{-5}$, $\alpha=1$, $p=2$. The expected means can be determined by determining a Gaussian Mixture Model of 5 Gaussians with means $U_1$. The expected means of each material can be calculated based on a smoothed and/or filtered MRA imaging data.

For example, the MRA imaging data can be smoothed and/or a background threshold can be determined. The MRA imaging data can be smoothed via a Gaussian smoothing method with $\sigma=1$. The background threshold can be determined as shown in EQN. 1 and 2, as follows:

$$\text{NoDataThreshold}=0.02*\max\nolimits_{HU}(\text{Smoothed MRA imaging data}) \quad \text{EQN. 1}$$

$$\text{modified MRA imaging data}=[1>\text{NoDataThreshold}] \quad \text{EQN. 2}$$

The expected means can be set to $[U_1, \ldots U_5]$. The BPM can be determined based on the output of the bias field estimation. The initial material classification for the MRA imaging data can be based on the BPM values. For example, voxels with a BPM value of 1 can be initially classified as "Air"; all voxels not classified as air can be classified as "body"; voxels at the perimeter of the "body" can be classified as "skin"; voxels with a BPM value of 2, that are classified as "body" and not classified as "skin" can be classified as "soft tissue"; voxels with a BPM value of 3 that are classified as "body" and not classified as "skin" can be classified as "muscle"; voxels with a BPM value above 4 that are classified as "body" and not classified as "skin" are classified as "vasculature"; remaining voxels are classified as "noise".

ii. Segmenting the Voxels

The 3D imaging data voxels can be segmented based on the initial material classification index. For example, assume that the material classification is bone, vasculature, and muscle. Each voxel in the 3D imaging data having a material classification of bone can be segmented into a first segment, each voxel in the 3D imaging data having a material classification of vasculature can be segmented into a second segment, and each voxel in the 3D imaging data having a material classification of muscle can be segmented into a third segment.

In some embodiments, the segmentation can further involve dilating, eroding, opening and/or closing initially segmented voxels. In some embodiments, the segmentation can vary based on the type of 3D imaging data (e.g., CT imaging data, CBCT imaging data, or MRA imaging data).

In some embodiments, the CT imaging data can be segmented into vessels, bones, muscle, and/or low contrast vasculature. For a vessel segment ("VesselSegment"), the segmentation can be determined as follows:
  a. Voxels that are initially classified as "Bone" or "Vasculature" can be segmented into a general segment ("GeneralSegment");
  b. Voxels that are initially classified as "Dense Bone" or "Teeth" can be segmented into possibly metal segment ("PossibleMetalSegment");
  c. Voxels that are initially classified as "Vasculature" can be intermittently into a low vessel segment ("LowVesselSegment");
  d. VesselSegment=GeneralSegment∪(|∇g|<150):
     The magnitude of the gradient |∇g| can be determined as shown in EQN. 3 through 6, as follows:

$$G_x(x', y', z') = \frac{\delta I}{\delta x} = \frac{I(x'+1, y', z') - I(x', y', z')}{2} \quad \text{EQN. 3}$$

$$G_y(x', y', z') = \frac{\delta I}{\delta y} = \frac{I(x', y'+1, z') - I(x', y', z')}{2} \quad \text{EQN. 4}$$

$$G_z(x', y', z') = \frac{\delta I}{\delta z} = \frac{I(x', y', z'+1) - I(x', y', z')}{2} \quad \text{EQN. 5}$$

$$\nabla g = [G_x, G_y, G_z] \quad \text{EQN. 6}$$

where x', y' and z' are coordinates of the current voxel for which the material classification index is being determined. A magnitude of the gradient can be determined as shown in EQN. 7, as follows:

$$|\nabla g| = \sqrt{G_x^2 + G_y^2 + G_z^2} \quad \text{EQN.7}$$

e. PossibleMetalSegment=PossibleMetalSegment⊕3;
  f. VesselSegment=VesselSegment∪(PossibleMetalSegment∩GeneralSegment)—e.g., step "f" can remove images of a stent or other metal elements around vessels;
  g. LowVesselSegment=(LowVesselSegment⊖1)⊚3—e.g., step "g" can connect small vessels to each other, the opening operation can remove noise caused by muscle tissue;
  h. VesselSegment=((VesselSegment∪LowVesselSegment)⊚1)⊖2—e.g., step "v" can connect small vessels to the large vessels in VesselSegment, and can remove noise from bone tissues around the vessels;
  i. Remove all connected components that are under 1000 voxels from VesselSegment—e.g., to eliminate noise that is, for example, characterized, or caused, by small connected components; and
  j. VesselSegment=VesselSegment⊖4—e.g., VesselSegment can include vessel tissues or boundaries of soft tissue.

A bone segment ("BoneSegment") can be determined as follows:
  a. Voxels that are initially classified as "Bone" or "Dense Bone" or "Teeth" can be segmented into true bone segment ("TrueBoneSegment");
  b. Remove connected components below 50 voxels from the TrueBoneSegment—e.g., step "b" can reduce calcifications that were classified as bone;
  c. TrueBoneSegment=TrueBoneSegment⊕4—e.g., can ensure that TrueBoneSegment covers an area surrounding dense bone tissue;
  d. PossibleBoneSegment=GeneralSegment∩¬VesselSegment;
  e. Remove from PossibleBoneSegment every connected component that does not touch TrueBoneSegment by 100 voxels to obtain BoneSegment—e.g., step "e" can connect the soft bone tissue voxels to the dense bone tissue voxels.

A muscle segment ("MuscleSegment") can be determined as follows:
  a. Voxels that are initially classified as "Muscle" can be segmented into MuscleSegment;
  b. Voxels that are initially classified as "Vasculature" can be segmented into a low contrast Segment "(LowContrastSegment").

In some embodiments, certain voxels segmented as "Vasculature" or "Bone" are improperly segmented, as they can be of another object (e.g., an object with an HU>100). In some embodiments, voxels can be segmented as "Bed" or "Skin," as follows:
  a. Voxels with HU above −150 can be segmented into a relevant segment ("RelevantSegment");
  b. A largest connected component in RelevantSegment can be segmented into an object segment ("ObjectSegment");
  c. ObjectSegment=ObjectSegment⊕2—e.g., step "c" can fill holes in ObjectSegment, ObjectSegment can describe the objects body in the scene, with its close surroundings;
  d. BedSegment=[HU>−500]∩¬ObjectSegment;
  e. SkinSegment=((ObjectSegment⊖1)∩¬(ObjectSegment⊕3))⊕2

In some embodiments, the CBCT imaging data can be segmented into skin and/or noise. A CBCT skin segment ("SkinSegment") and a noise segment ("NoiseSegment") can be determined as follows:
  a. A minimal HU the CBCT 3D imaging data can be marked as ("MinHUVal").
  b. A probable object segment ("ProbableObjectSegment) can be determined: ProbableObjectSegment=([HU>−500]⊙1)⊚1;
  c. An object segment ("ObjectSegment") can be determined by region growing ProbableObjectSegment with a standard deviation (e.g., 10), bounding the HU values to be between [−600,−500];

d. A relaxed object segment ("ObjectSegmentRelaxed") can be the result of region growing ProbableObjectSegment with HU values of [−700,−500] and standard deviation of 10;

e. ObjectSegment=(ObjectSegment⊙5)∪(ObjectSegmentRelaxed⊙5)—e.g., step "e" can fill holes in ObjectSegment;

f. NoiseSegment=[HU>−500]∩¬ObjectSegment;

g. SkinSegment=(ObjectSegment⊕1)∩¬(ObjectSegment e 1);

h. A DICOM scene segment ("DicomSceneSegment") can be determined: DicomSceneSegment= [HU>MinHUVal]

i. DicomSceneSegment=DicomSceneSegment⊙3—e.g., step "i" can fill holes in the DicomSceneSegment;

j. Remove the last 50 rows in DicomSceneMask—e.g., Step "j" can be required due to the fact that most scans are in shape of a tube, thus the back parts of the skull can be neglected;

k. SkinSegment=(SkinSegment∩DicomSceneSegment) ⊕2;

l. NoiseSegment=NoiseSegment∩¬SkinSegment.

iii. Performing a Final Material Classification

A final material classification can be determined. In some embodiments, the 3D imaging data can have a final material classification that is equal to the initial material classification.

The 3D imaging data can be finally materially classified based on the segmentation.

In various embodiments, for CT imaging data, voxels belonging to (GeneralSegment∩¬VesselSegment∩PossibleBoneSegment) can be finally materially classified as "Dense Bone"; voxels belonging to (GeneralSegment∩(VesselSegment∩(¬VesselSegment ∪ ¬PossibleBoneSegment))) can be finally materially classified as "Vasculature"; voxels belonging to (TrueBoneSegment∩(MuscleMsak∪LowContrastSegment)) can be classified as "Bone/Vasculature"; voxels belonging to (¬TrueBoneSegment∩¬MuscleSegment∩ (MuscleMsak∪LowContrastSegment)) can be finally materially classified as "Noise."

In some embodiments, voxels that have an initial material classification of "Fat" are removed using the open operation with 1 voxel radius of the "Fat" voxels. The removed voxels can be finally materially classified as "Noise."

In various embodiments, voxels in SkinSegment can be finally materially classified as "Skin" and/or voxels in "BedSegment" can be finally materially classified as "Bed."

In various embodiments, for CBCT imaging data, voxels belong to NoiseSegment are finally materially classified as "Noise" and SkinSegment can be finally materially classified as "Skin."

In some embodiments, voxels of MRA imaging data are finally materially classified according to their initial material classification.

Various corrections or modifications of voxels material classifications can be made. For example, there might be voxels with HU values that are far from their initial threshold (e.g., due to the operations as described above) which can be misclassified. To correct such misclassifications, an embodiment can perform some or all of the following steps:

a. "Fat" voxels with HU above −20 are classified as Vasculature;

b. "Fat" voxels that are neighbors to a bone tissue voxel are classified as "Bone";

c. "Muscle" voxels that have HU above 390 are classified as Bone/Vasculature;

d. "Skin" voxels with HU above 10 are classified as Muscle.

Determining the material classification index for CT imaging data can also involve determining a maximal dimension of the input CT imaging data (e.g., the maximal width/length/depth) and, if the maximal dimension is above a threshold value, the CT imaging data can be scaled e.g., to a predefined dimension The method can also involve determining a transfer function (e.g., transfer function 134, as described above in FIG. 1) for each material classification (Step 215). For example, if the material classification (e.g., indicates a bone) of a first voxel of the 3D imaging data is different than the material classification (e.g., value indicates a tissue) of a second voxel, then the first voxel can be rendered using a first transfer function, and the second voxel can be rendered using a second transfer function. The first transfer function and the second transfer function can be different.

The transfer function can be determined by selecting one transfer function from a set of transfer functions. The set of transfer functions can be stored in memory and/or input by a user. The set of transfer functions can be based on desired color for a particular object type. For example, vessels are typically red, and bone is typically white. Therefore, the transfer function can include a smooth transfer of colors between red and white. As is apparent to one of ordinary skill, this transfer function and colors discussed are for example purposes only. In some embodiments, the transfer functions can be constant for different HU/grayscale values (e.g., for CBCT and/or MRA). Table 1 shows an examples of transfer functions based on classification and HU value, as follows:

TABLE 1

| Classification | HU Value | RGB Value |
|---|---|---|
| Air | −2048 and −600 | (0, 150, 150) |
| Skin Fat | −2048 and −600 | (255, 70, 30) |
| Skin Fat | 400 and −61 | (255, 70, 30) |
| Skin Fat | −60 and 0 | Smoothly transferring between (255, 70, 30) to (134, 6, 6) |
| Skin Fat | 1 and 100 | Smoothly transferring between (134, 6, 6) to (251, 135, 115) |
| Skin Fat | 101 and 500 | Smoothly transferring between (251, 135, 115) to (247, 170, 119) |
| Skin Fat | above 501 | (247, 170, 119) |
| Skin | −2048 and −61 | (255, 70, 30) |
| Skin | −60 and 20 | Smoothly transferring between (255, 70, 30)to (65, 0, 00) |
| Skin | above 20 | (65, 0, 0) |
| Fat | −2048 and −61 | (255, 120, 17) |
| Fat | −60 and 200 | Smoothly transferring between (255, 120, 17) to (65, 0, 0) |
| Fat | 200 and 800 | Smoothly transferring between (65, 0, 0) to (251, 135, 115) |
| Fat | above 800 | (251, 135, 115) |
| Muscle | −2048 and 100 | (65, 0, 0) |
| Muscle | 101 and 800 | Smoothly transferring between (65, 0, 0) to (251, 135, 115) |
| Muscle | above 800 | (251, 135, 115) |
| Muscle/Vessel | −2048 and 199 | (134, 6, 6) |
| Muscle/Vessel | 200 and 800 | Smoothly transferring between (134, 6, 6) to (251, 135, 115) |
| Muscle/Vessel | above 800 | (251, 135, 115) |
| Vessel | −2048 and 300 | (134, 6, 6) |
| Vessel | 200 and 800 | Smoothly transferring between (134, 6, 6) to (251, 135, 115) |
| Vessel | above 800 | (251, 135, 115) |
| Bone/Vessel | −2048 and 0 | (134, 6, 6) |
| Bone/Vessel | 0 and 150 | Smoothly transferring between (134, 6, 6) to (251, 135, 115) |
| Bone/Vessel | 151 and 400 | Smoothly transferring between (251, 135, 115) to (247, 170, 119) |
| Bone/Vessel | above 400 | (247, 170, 119) |

TABLE 1-continued

| Classification | HU Value | RGB Value |
|---|---|---|
| Bone Boundary | −2048 and 0 | (247, 170, 119) |
| Bone Boundary | 0 and 150 | Smoothly transferring between (247, 170, 119) to (205, 205, 205) |
| Bone Boundary | above 150 | (205, 205, 205) |
| Strong Bone | All | (255, 255, 255) |
| Teeth | All | (255, 255, 255) |
| Vessel Noise | All | (0, 0, 0) |
| Bed | All | (0, 0, 0) |

In some embodiments, multiple material classifications can have the same transfer function. For example, for CBCT imaging data, material classified as "Soft Tissue" can have the same transfer function as material classified as "Fat." In another example, material classified as "Bone" can have the same transfer function as material classified as "Dense Bone"

The method can also involve rendering each voxel by applying a transfer function that corresponds to the material classification corresponding to the voxel (Step 220). The transfer function can receive as input a HU value for the respective voxel. Based on the HU value, the transfer function can output a color (e.g., RGB color) to render the voxel.

Figure 4:
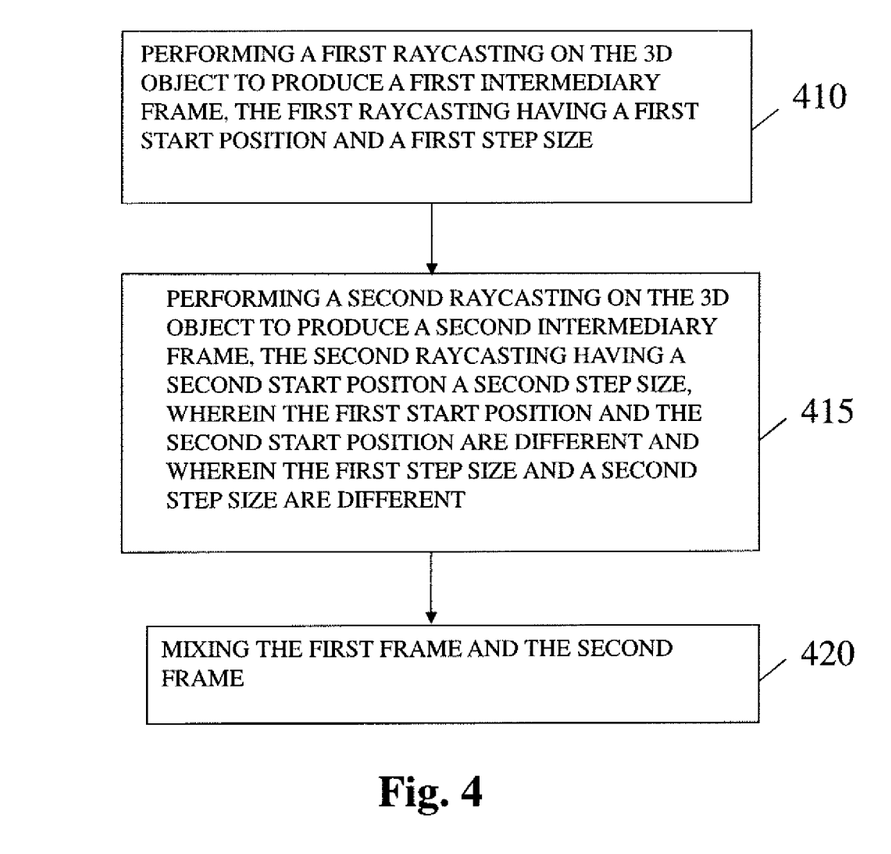
FIG. 4 shows a flowchart of a method for rendering 3D objects, according to an illustrative embodiment of the invention.

FIG. 4 is a flowchart of a method for volume rendering, according to some embodiments of the invention. Rendering 3D objects can involve identifying a region of interest and determining which points in that region of interest to render. For example, rendering 3D objects can involve raycasting. For each frame that is rendered on a 2D screen, into a virtual reality setting, and/or into an augmenting reality setting, raycasting can be performed. Each time a visualized image is changed (e.g., zoom, rotate, and/or modified), typically multiple new frames can be determined, and, for each new frame, raycasting can be performed. Current methods for raycasting can be computationally intensive and/or result in large amounts of data, which can cause rendering of 3D objects via raycasting to be prohibitively slow. For example, rendering a 3D object of a heart onto a 2D screen, such that a user can rotate the heart, can cause the image of the heart when rotating to appear pixelated and/or cause a user's computer to crash. The method can involve raycasting incrementally, which can cause computational intensity and/or data amount to be reduced.

The method can involve performing a first raycasting on the 3D object to produce a first intermediary frame, the first raycasting having a first start position and a first step size (Step 410). The raycasting can have a sampling rate, the step size can be based on the sampling rate. For example, if the sampling rate is 10 points per ray, then the step size can be ¹⁄₁₀. The 3D object can be described by a volume. The volume can be a cube that wholly encompasses (or substantially wholly encompasses) the 3D object.

The volume size can depend on a size of the 3D object, resolution of the 3D object, or any combination thereof. For example, a pediatric cardiac CT can be physically small, but the volume can be high, due to, for example, a high resolution scan. In some embodiments, the volume can have a size of 255×255×300 voxels. In various embodiments, the volume is any volumetric shape as is known in the art.

The first start position can be a first voxel that has data in the volume that from the viewpoint direction.

The method can involve performing a second raycasting on the 3D object to produce a second intermediary frame (Step 415). The second raycasting can include a second start position a second step size. The first start position and the second start position can be different. The second start position can be offset from the first start position. The offset can be a randomly generated number, a user input, based a noise function of a GPU, a constant value, or any combination thereof. In some embodiments, the offset is a random number between 0 and 1. In some embodiments, the offset is checked to ensure that the second start position is not beyond a predetermined distance from the first start position.

The first step size and the second step size can be different. The second step size can be offset from the first step size. In some embodiments, the offset is greater than ¼ the first step size.

As shown by step 420, the method can include mixing the first intermediary frame and the second intermediary frame to render the 3D object. Mixing the first intermediary frame and the second intermediary frame can involve mixing values (e.g., color values) of pixels of the first frame and the second frame that are at the same location in the frame.

In some embodiments, mixing values involves taking an average of pixels of the first intermediary frame and the second intermediary frame that are at the same location in the frame. In some embodiments, mixing values involves taking a weighted average of pixels. For example, a higher weight can be given to a first frame and a lower weight can be given to a second, subsequent frame such that the second subsequent frame has less influence on the resulting pixel or frame. In some embodiments, mixing can be done with other functions that are selected based on the 3D object data type. For example, if the 3D object data type is mesh and ray intersection is performed, then a mixing function capable of mixing two or more ray intersections can be used.

In some embodiments, the raycasting is performed more than n times, where n is an integer. In some embodiments, n is based on a desired level of detail in the rendered object. In some embodiments, n is an input. Each time a raycasting is done, the start position and/or the step size for each raycasting performed can be different or the same as the previous raycasting operation. In these embodiments, each time a raycasting is done, the mixing can involve determining an accumulated average of all raycastings. In some embodiments, each time a ray is cast, detail is added and/or the rendered object will appear richer. In some embodiments, the number of times the raycasting is performed depends on a desired level of fidelity for the image.

As described above, current method for volume rendering can be prohibitively slow. One difficulty is that typically during volume rendering all voxels within the volume, whether present or not, are rendered. For example, some parts of a volume can contain or include no corresponding data. For example, a 3D object of a head can occupy only part of a volume having a size of 64×64×256 voxels. Rendering all voxels in the 64×64×256 volume can be inefficient, since many of the voxels do not have any data that is of interest to rendered (e.g., data outside of or unrelated to the object). In various embodiments, the volume is any volumetric shape as is known in the art.

Figure 5:
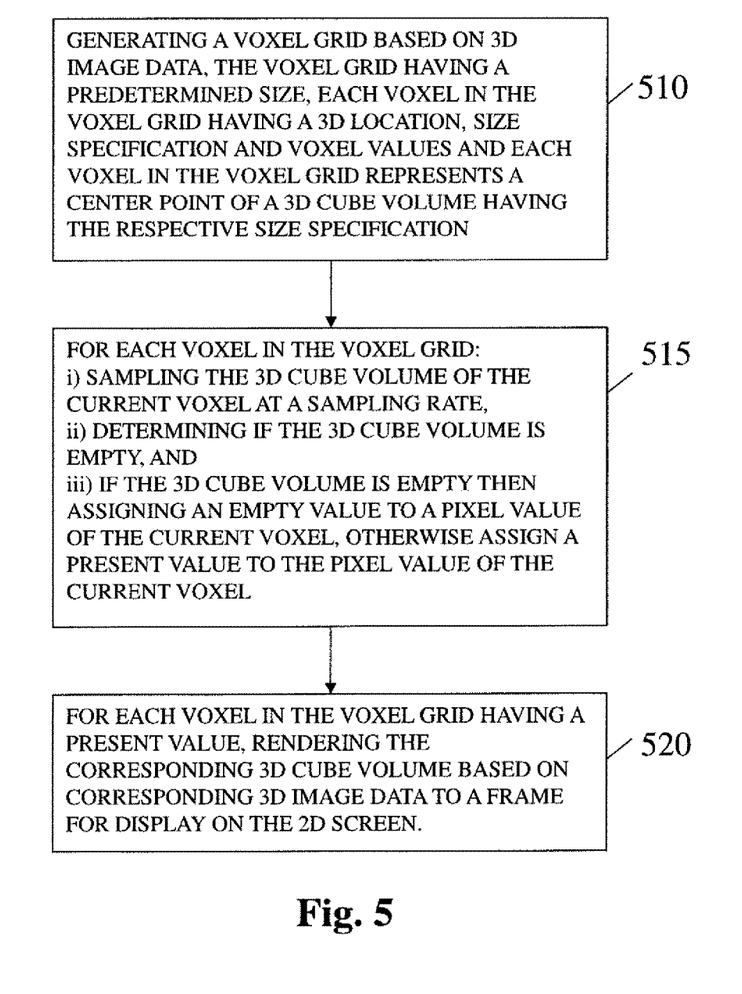
FIG. 5 shows a flowchart of a method for rendering 3D objects, according to an illustrative embodiment of the invention.

FIG. 5 a flowchart of a method for volume rendering, according to an illustrative embodiment of the invention. Generally, the method can involve creating cubes within a volume, and determining whether any data exists within each cube (e.g., determining a voxel grid). If a cube is empty the method can involve marking the cube as empty, e.g., by assigning a predefined value to the voxel. If the cube is not empty, e.g., includes data, then the method can involve using the value of the cube for rendering the 3D object to a frame for display on a 2D screen. In this manner, a number of cubes to render can be reduced. In various embodiments, the cube is any volumetric shape as is known in the art.

The method can involve generating a voxel grid based on the 3D object, each voxel in the voxel grid having a 3D location, size specification and voxel values (Step 510). Each voxel in the voxel grid can represent a center point of a 3D cube volume. Multiple 3D cube volumes can be used such that they fill a volume space.

For example, a volume can have a size of 255×255×300 voxels. Multiple 3D cubes can be generated within the volume into 3D cubes volumes, each of the multiple 3D cubes having a unique 3D location within volume. The 3D cube volume can have size specification. The size specification can be a number of voxels to contain within the 3D cube volume or a 3D size specification (e.g., A×B×C voxels). For example, the 3D cube volume can have a size specification of 27 neighbor voxels. In this example, the 3D cube volume has size of 3×3×3 voxels. In another example, the 3D cube volume can have a size specification of 4×4×4 voxels. In this example, the 3D cube volume has 64 voxels disposed therein. The size specification can be input by a user and/or depend on the object type of the 3D object.

The voxel grid can be generated by determining a center point of each 3D cube volume and assigning that center point to the voxel grid. For example, assume a volume that has four 3D cubes and that each 3D cube has 4 voxels disposed therein. In this example, the volume has 16 voxels, and the voxel grid has 4 voxels.

The method also involves for each voxel in the voxel grid: i) determining if the 3D cube volume is empty, and ii) if the 3d cube volume is empty then assigning an empty value to the current voxel in the voxel grid, otherwise assign a present value to the current voxel in the voxel grid (Step 515).

Determining if the 3D cube volume cube volume is empty can involve evaluating the sampled voxels. If the sampled voxels contain values, then it is determined that the 3D cube volume is not empty. If the sampled voxels do not contain values, then it is determined that the 3D cube volume is empty. In some embodiments, if the values of the sampled voxels are above a threshold, then it is determined that the 3D cube volume is not empty, and if they are below a threshold, then it is determined that the 3D cube volume is empty.

Processing can decrease dramatically by identifying and ignoring parts of the volume that have little or no data. For example, cubes located in the space (e.g., air) around a 3D model of a head can be given a value of zero and can be ignored, thus, drastically decreasing the required processing.

In some embodiments, a tree structure is created, by setting a size of cubes (e.g., relative to the size of the 3D object and/or 1/64 cube sizes, 64×64×64), checking input data (e.g. CT data) for each cube, if the input data (e.g. the CT data) in the cube doesn't have values bigger than a threshold, some embodiments can mark the cube as not interesting (e.g., give it a value of zero or any other predefined value that represents no data). Cubes marked as not interesting (e.g., containing no data) can be ignored in further processing, e.g., left out of a tree structure.

If a value greater than a threshold is found in a cube, some embodiments can mark the cube as interesting (e.g., give it a value of one or any other predefined value that represents data). Cubes marked as interesting (e.g., containing data) can be inserted or included in a tree structure. In some embodiments, a mesh can be created based on the tree structure, e.g., based on the cubes marked as interesting.

The method can also involve for each cube in a voxel grid having a present value, rendering the corresponding 3D cube volume based on corresponding 3D object (Step 520). For example, if a cube in a volume includes data (e.g., RGBA values that indicate or correspond to an object such as bone or blood vessel) then values of a pixel representing the cube in a 2D frame can be determined based on the data of the cube. In some embodiments, a tree that includes cubes marked as interesting can be created by a CPU, e.g., by controller 105. In some embodiments, a tree can be created by a dedicated hardware unit, e.g., by a graphics processing unit (GPU).

For example, in some embodiments, a GPU can define a voxel grid, e.g., generate, based on 64×64×64 voxels in a memory of the GPU, a voxel grid, having a cube at each of the points, (each having a 3D position and 3D size). It will be noted that implementing the method of FIG. 5 with a GPU can increase speed in comparison with a CPU.

A size of a 3D space over which an embodiment can search for cubes with (and/or without) data as described can be defined by a user. For example, rather than a volume of size 64×64×256 as described, any other size can be selected by a user. Any sampling rate, step or resolution can be used, e.g., instead of an 8×8×8 cube used for analyzing cubes in a GPU, a 16×16×16 cube can be used, e.g., in order to increase performance.

Figure 6:
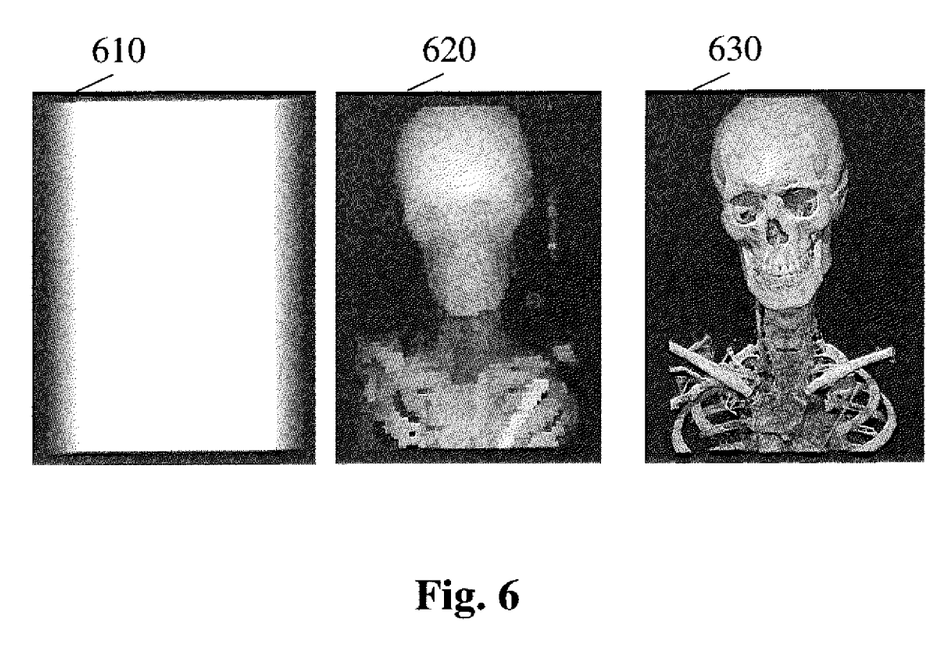
FIG. 6 shows screenshots of a volume, an optimized tree and a frame, according to some embodiments of the invention.

FIG. 6 shows screenshots of a volume, an optimized tree and a frame according to some embodiments of the invention. As shown by screenshot 610, a volume can be represented by a single cube. As shown by screenshot 620, the volume can be broken into smaller cubes. For example, instead of using one cube for the whole, or entire, volume, some embodiments can break the volume into smaller cubes, possible with the same size. The color of cubes can be based on whether or not an area in the volume includes data. Screenshot 630 shows an example of volume rendered created using a tree as described.

As is apparent to one of ordinary skill in the art, the volume rendering can include any combination of performing the material classification, tree optimization, and incremental raycasting.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

Unless explicitly stated, the method embodiments described herein are not constrained to a particular order in time or chronological sequence. Additionally, some of the described method elements can be skipped, or they can be repeated, during a sequence of operations of a method.

While certain features of the invention have been illustrated and described herein, many modifications, substitutions, changes, and equivalents can occur to those skilled in the art. It is, therefore, to be understood that the appended claims are intended to cover all such modifications and changes as fall within the true spirit of the invention.

Various embodiments have been presented. Each of these embodiments can of course include features from other embodiments presented, and embodiments not specifically described can include various features described herein.

The invention claimed is:

1. A method for volume rendering a three-dimensional ("3D") object via a graphical processing unit, the method comprising:
   performing, via the graphical processing unit, a first raycasting on the 3D object to produce a first intermediary frame, the first raycasting having a first start position and a first step size;
   offsetting the first step size of the first raycasting based on an offset to produce a second step size different from the first step size;
   performing, via the graphical processing unit, a second raycasting on the 3D object to produce a second intermediary frame, the second raycasting having a second start position and the second step size, wherein the first start position of the first raycasting and the second start position of the second raycasting are different and wherein the first step size of the first raycasting and the second step size of the second raycasting are different; and
   mixing, via the graphical processing unit, the first intermediary frame and the second intermediary frame to render the 3D object.

2. The method of claim 1 wherein the first step size is based on a sampling rate of the raycasting.

3. The method of claim 1 wherein mixing further comprises:
   for each pixel in the first intermediary frame and the second intermediary frame at a pixel location that is the same, mixing the first intermediary frame values and the second intermediary frame values at the pixel location to determine final pixel values at the pixel location.

4. The method of claim 1 wherein mixing the first intermediary frame values and the second intermediary frame values at the pixel location further comprises averaging the first intermediary frame values and the second intermediary frame values, performing a weighted averaging of the first intermediary frame values and the second intermediary frame values, accumulated averaging, or any combination thereof.

5. The method of claim 1 wherein the second start position is the first start position with an offset value.

6. The method of claim 5 where the offset value is randomly generated, input by a user, or any combination thereof.

7. A non-transient computer readable medium containing program instructions for causing a graphical processing unit to perform the method of:
   performing a first raycasting on the 3D object to produce a first intermediary frame, the first raycasting having a first start position and a first step size;
   offsetting the first step size of the first raycasting to produce a second step size different from the first step size;
   performing a second raycasting on the 3D object to produce a second intermediary frame, the second raycasting having a second start position and the second step size, wherein the first start position of the first raycasting and the second start position of the second raycasting are different and wherein the first step size of the first raycasting and the second step size of the second raycasting are different; and
   mixing the first intermediary frame and the second intermediary frame to render the 3D object.

8. A method for volume rendering three-dimensional (3D) image data via a graphical processing unit, the method comprising:
   generating, via the graphical processing unit, a voxel grid based on the 3D object, the voxel grid composing a plurality of voxels, and a plurality of 3D cube volumes each comprised of a plurality of voxels of the voxel grid, each voxel associated with a 3D cube volume;
   each voxel in the voxel grid having a three dimensional location, a size specification measured in voxels and corresponding to the size of a 3D cube volume of the voxel grid of which the voxel is the center, and voxel values: and each voxel in the voxel grid representing a center point of a 3D cube volume having the size specification of the voxel at the center of the cube, measured in voxels, wherein the voxel grid is 3D data;
   for each voxel in the voxel grid:
   determining, if the 3D cube volume placed at the voxel location of the current voxel with a size specified to the current voxel is empty, and if the 3D cube volume is empty assigning, via the graphical processing unit, an empty value to the current voxel in the voxel grid, otherwise assigning a present value to the current voxel in the voxel grid; and
   for each voxel in the voxel grid having a present value, rendering, via the graphical processing unit, the corresponding 3D cube volume based on the corresponding 3D object to a frame for display on the 2D screen.

9. The method of claim 8 wherein the size specification is input by a user, based on a type of the 3D object, size of the 3D object or any combination thereof.

10. The method of claim 8 further comprising rendering the voxel grid based on the present and empty values to a frame for display on the 2D screen.

11. A non-transient computer readable medium containing program instructions for causing a computer processor to perform the method of:
    generating a voxel grid based on the 3D object, the voxel grid comprising a plurality of voxels, and a plurality of 3D cube volumes comprised of a plurality of voxels of the grid, each voxel associated with a 3D cube volume;
    each voxel in the voxel grid having a three dimensional location, a size specification measured in voxels and corresponding to the size of a 3D cube volume of the voxel grid of which the voxel is the center, and voxel values and each voxel in the voxel grid representing a center point of the 3D cube volume having the size specification of the voxel at the center of the cube, measured in voxels, wherein the voxel grid is 3D data;
    for each voxel in the voxel grid:
    determining, if the 3D cube volume placed at the voxel location of the current voxel with a size specified to the current voxel is empty, and if the 3D cube volume is empty assigning, via the computer processor, an empty value to the current voxel in the voxel grid, otherwise assigning a present value to the current voxel in the voxel grid; and for each voxel in the voxel grid having a present value, rendering the corresponding 3D cube volume based on the corresponding 3D object to a frame for display on the 2D screen.

* * * * *